United States Patent [19]
Levine et al.

[11] 4,452,578
[45] * Jun. 5, 1984

[54] SPRAY APPARATUS FOR METAL FORMING AND GLASSWARE FORMING MACHINES

[75] Inventors: Walter E. Levine; Allan B. Heath; Richard C. Gossman, all of Port Huron, Mich.

[73] Assignee: Acheson Industries, Inc., Port Huron, Mich.

[*] Notice: The portion of the term of this patent subsequent to Dec. 21, 1999 has been disclaimed.

[21] Appl. No.: 404,480

[22] Filed: Aug. 6, 1982

Related U.S. Application Data

[63] Continuation-in-part of Ser. No. 297,017, Aug. 27, 1981, Pat. No. 4,364,719.

[51] Int. Cl.³ .......................... B05B 1/34; C03B 4/02; B21B 45/02
[52] U.S. Cl. ................................ 239/463; 65/24; 65/169; 65/170; 72/45; 239/561; 425/78
[58] Field of Search .................. 425/95, 78, 98, 107, 425/352, 354, 355, DIG. 115, 90; 65/169, 24, 25.1, 170; 164/149, 267; 239/561, 463; 72/44, 45

[56] References Cited

U.S. PATENT DOCUMENTS

| | | | |
|---|---|---|---|
| 2,317,687 | 4/1943 | Larchor | 425/107 |
| 2,362,058 | 11/1944 | Emerson | 425/95 |
| 3,132,379 | 5/1964 | Crane | 425/DIG. 115 |
| 3,141,752 | 7/1964 | Keller | 65/25.1 |
| 3,186,818 | 6/1965 | Havens et al. | 65/169 |
| 3,309,750 | 3/1967 | Gally | 425/DIG. 115 |
| 3,443,280 | 5/1969 | Hugger | 425/36 |
| 3,480,422 | 11/1969 | Lichok et al. | 65/169 |
| 3,508,893 | 4/1970 | Duggan | 65/24 |
| 3,536,468 | 10/1970 | Colchagoff | 65/208 |
| 3,580,711 | 5/1971 | Hamilton | 65/169 |
| 3,623,856 | 11/1971 | Keller | 65/169 |
| 3,645,319 | 2/1972 | Pondelicek et al. | 425/107 |
| 3,801,299 | 4/1974 | Renkl | 65/169 |
| 3,995,979 | 12/1976 | Fedrigo | 425/DIG. 115 |
| 3,999,922 | 12/1976 | Shimada | 425/354 |
| 4,029,449 | 6/1977 | Longaberger | 425/48 |
| 4,223,544 | 9/1980 | Main | 72/45 |
| 4,262,512 | 4/1981 | Maeder | 72/45 |
| 4,300,375 | 11/1981 | Maeder et al. | 72/45 |
| 4,333,756 | 6/1982 | Seeman | 65/25.1 |
| 4,364,719 | 12/1982 | Levine | 425/107 |

FOREIGN PATENT DOCUMENTS 1349121 4/1971 United Kingdom .

Primary Examiner—Willard E. Hoag
Attorney, Agent, or Firm—Harness, Dickey & Pierce

[57] ABSTRACT

A new spray ring apparatus for use in forming apparatus of the type used in metal forming and glassware forming which include a forming cavity into which a fluid lubricant material is sprayed. In one embodiment, the spray ring includes a plurality of nozzles through which the fluid lubricant material is sprayed into the cavity in a tangential helical flow pattern to thereby uniformly coat the interior surfaces of the cavity prior to the forming of the metal or glassware parts therein. In another embodiment, an annular nozzle flowpath is provided with the helical flow pattern being imparted to the lubricant material via a tangentially disposed inlet opening into an annular manifold chamber. A plurality of nozzle openings may be provided in the outer surface of the spray ring which may operate to uniformly coat the outer surfaces of a punch or similar type of associated overlying forming tool.

10 Claims, 17 Drawing Figures

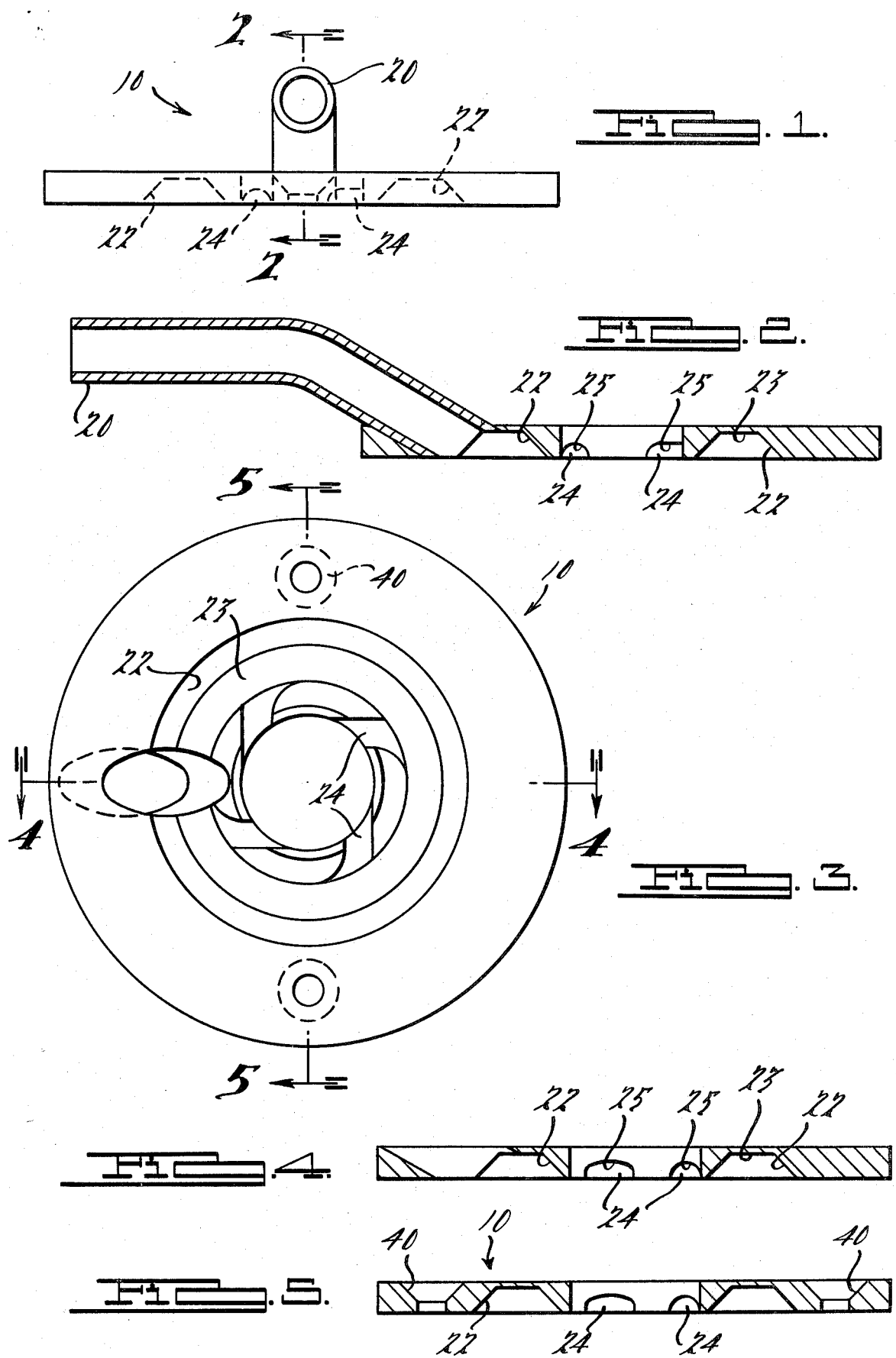

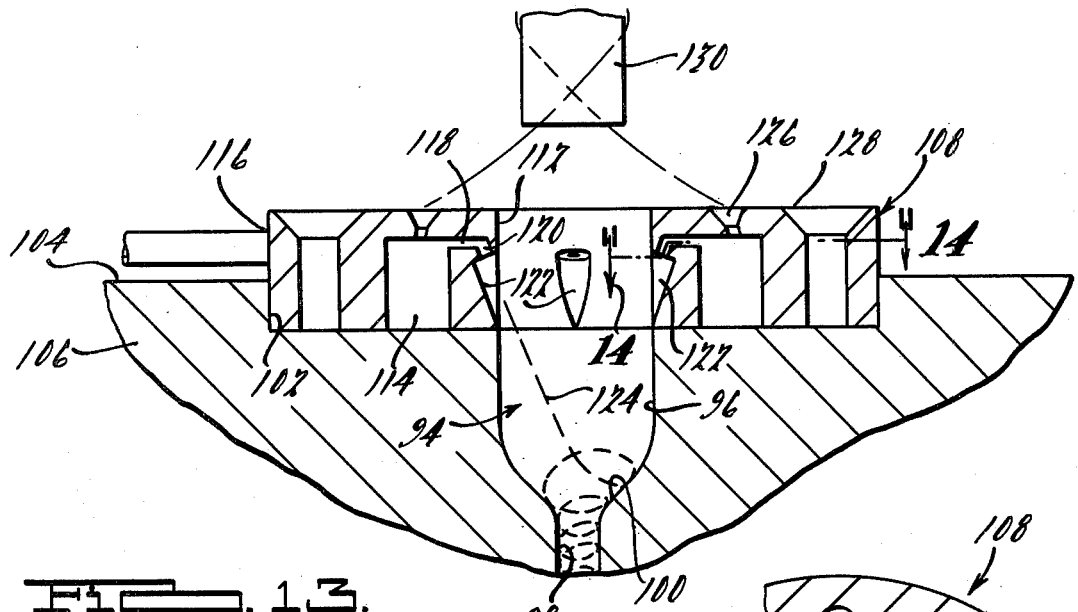
FIG. 13.
FIG. 14.
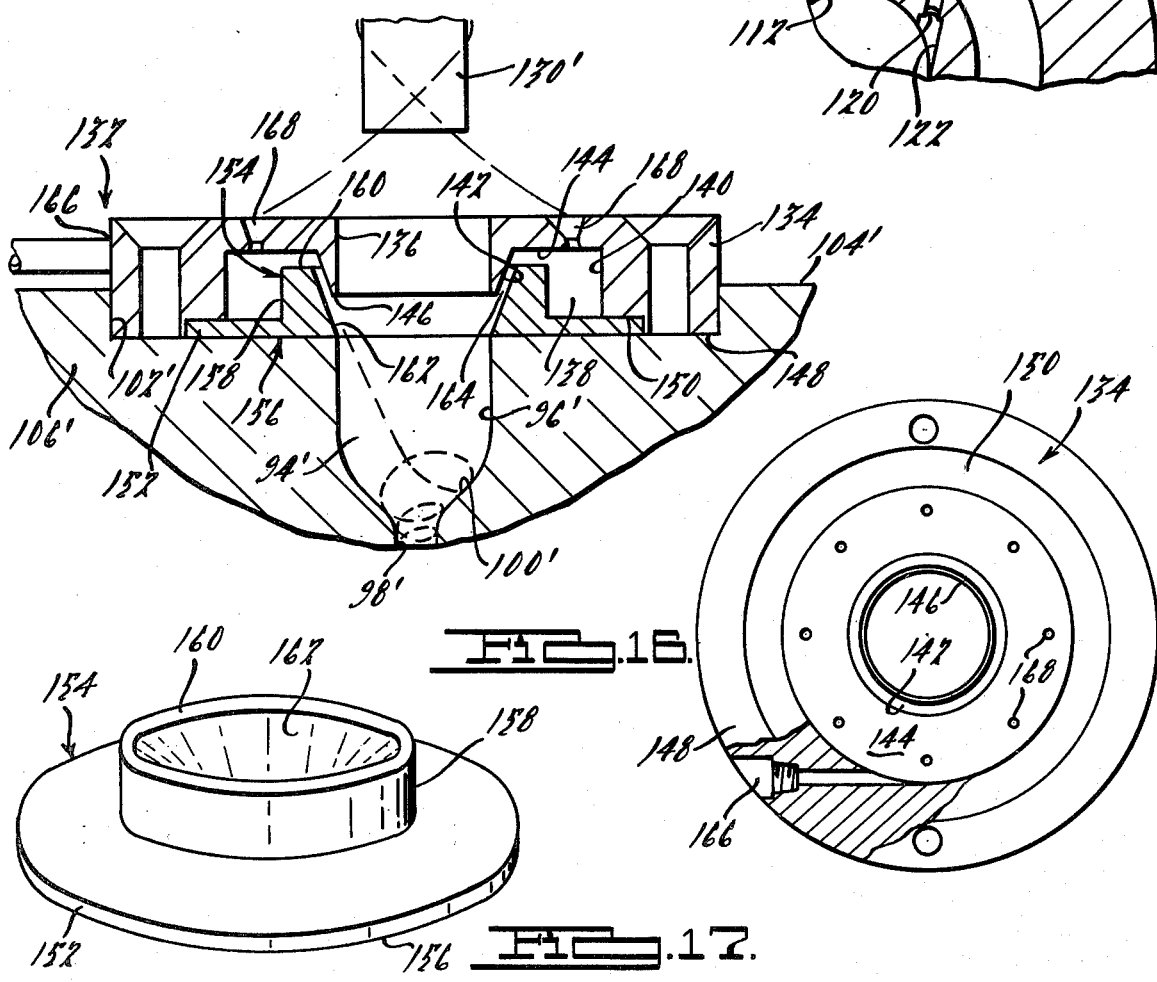
FIG. 15.
FIG. 16.
FIG. 17.

SPRAY APPARATUS FOR METAL FORMING AND GLASSWARE FORMING MACHINES

RELATED APPLICATIONS

This application is a continuation-in-part of application Ser. No. 297,017 filed Aug. 27, 1981, U.S. Pat. No. 4,364,719.

BACKGROUND OF THE INVENTION

This invention broadly relates to a novel lubricant spraying apparatus for use in forming machines and in particular in metal forming and glassware forming machines. More particularly, the invention relates to a special spray ring apparatus used in such machines which includes an annular or a plurality of special nozzles which enable the fluid lubricant material to be sprayed into the cavity of the forming machine as well as other forming means associated therewith such that the interior and exterior surfaces thereof are uniformly and properly coated with the lubricant.

In the past there have been numerous problems in metal forming and glassware forming machines caused by the fact that the forming cavities utilized therein were not properly coated with the lubricant material which is conventionally used therein to provide lubricating and release agent properties to the cavity during the forming operations therein and for release of the part after the forming operation has been completed. Such problems are highly significant in that improper lubricant coating can lead to highly serious distortions, deformations, improper configurations, etc. in the part being formed in the cavity.

The state of the art is indicated by the following U.S. patents: Hamilton Pat. No. 3,580,711; Duggan Pat. No. 3,508,893; Colchagoff Pat. No. 3,536,468; Keller Pat. No. 3,623,856; Keller Pat. No. 3,141,752; Renkl Pat. No. 3,801,299; Lichok et al Pat. No. 3,480,422; Havens et al Pat. No. 3,186,818; and British Pat. No. 1,349,121.

Accordingly, it is a primary object of this invention to provide a new lubricant spraying apparatus for use with forming machines and particularly metal forming and glassware forming machines.

Another object of the invention is to provide a new spray ring apparatus for use with either metal forming or glassware forming machines wherein said spray ring apparatus include special nozzle means which are operative to spray a fluid lubricant material into the forming cavities of said machines in a unique manner such that the lubricant material is generally uniformly coated on the desired interior surfaces of the forming machine.

A further object of the present invention is to provide a new spray ring apparatus which also provides a plurality of nozzle means operative to apply a fluid lubricant material to the surfaces of an associated overlying forming tool of metal or glassware forming machines in a unique manner substantially simultaneously with the coating of the die cavity.

Other objects, features and advantages of the present invention will become apparent from the subsequent description and the appended claims taken in conjunction with the accompanying drawings.

SUMMARY OF THE INVENTION

Briefly stated, the present invention concerns a lubricant spraying apparatus for metal forming and glassware forming machines of the type having a forming cavity into which the material to be formed is placed, and a plurality of nozzle means arranged to discharge fluid lubricant into the cavity prior to each forming operation such that the walls of the cavity and parts associated therewith in the forming operation are properly coated with the lubricant, said apparatus being comprised of a spray ring means which is positioned generally around the opening of the cavity, said plurality of nozzle means being positioned on the spray ring and being operative to discharge fluid lubricant into the cavity in a helical tangential flow pattern, and conduit means for connecting the nozzle means and spray ring means to a source of fluid lubricant whereby a predetermined amount of lubricant can be supplied to the cavity at desired intervals of operation. In another embodiment of the spray ring apparatus, additional nozzles may be provided for simultaneously applying a fluid lubricant coating to associated male forming apparatus utilizing either a fan or helical tangential flow pattern.

BRIEF DESCRIPTION OF THE DRAWINGS

FIG. 1 is an elevational view of a spray ring assembly in accordance with the invention;

FIG. 2 is a sectioned view of the spray ring assembly of FIG. 1, the section being taken along line 2—2 thereof;

FIG. 3 is a bottom or plan view of the spray ring shown in FIGS. 1 and 2;

FIGS. 4 and 5 are sectioned views of the spray ring assembly of FIG. 3, the sections being taken along lines 4—4 and 5—5 respectively thereof;

FIG. 13 is a view similar to that of FIG. 6 but illustrating an additional embodiment of the present invention;

FIG. 14 is a fragmentary section view of a portion of the spray ring shown in FIG. 13, the section being taken along line 14—14 thereof.

DESCRIPTION OF THE INVENTION

Figure 6:
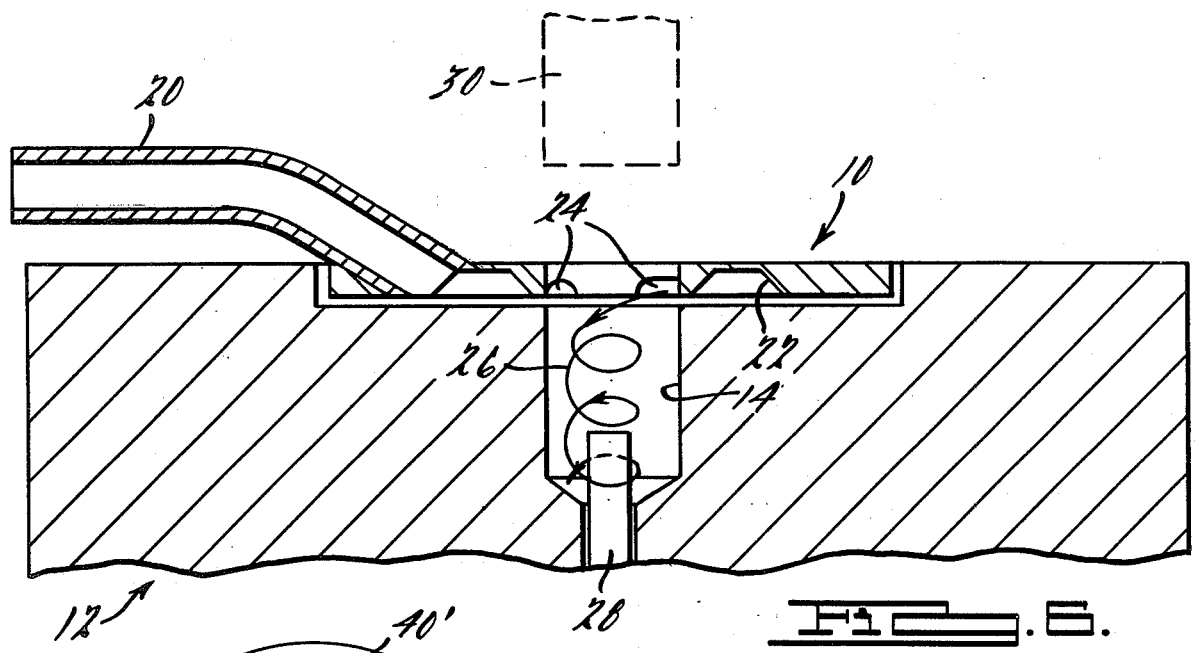
FIG. 6 illustrates usage of the spray ring of FIG. 2 in association with a metal forming machine.

Referring now to the drawings, FIGS. 1 through 5 illustrate the spray ring 10 in accordance with the invention. FIG. 6 illustrates the spray ring 10 in position on a metal forming machine 12 adjacent the top thereof and near the cavity 14 within which metal parts are formed. It is to be understood, however, that the invention is equally applicable to glassware forming machines.

The spray ring 10 is typically formed of metal and fits on top of a die cavity designated 14. For ease of illustration in FIG. 6, the spray ring 10 is shown in loose fitting engagement with the machine 12 near the top of the cavity 14, whereas, in actual practice the spray ring 10 would be in press fitting engagement with the top surface of the machine 12. In typical use of the spray ring 10 a lubricant composition and air mixture enters through the tubing or conduit means designated 20 and from there it travels around a grooved ring or manifold portion designated 22. The manifold has a top surface designated 23 (FIG. 2). The lubricant mixture then leaves the manifold 22 and enters the die cavity 14 at tangential nozzle openings designated 24. As the lubricant mixture leaves the spray ring 10 through the nozzle openings 24, the specially designed nozzles 24 create a tangential spray pattern for the atomized or fluidized lubricant air mixture, with the spray pattern or flow pattern of the lubricant being shown by the helical path designated 26 shown in FIG. 6. It is to be noted that each of the nozzle openings 24 has a top surface designated 25 (FIG. 2).

The spray ring 10, as shown in the drawings, contains four of the nozzle openings designated 24 and the tangential spraying of the lubricant mixture into the cavity causes what may be described as a helical or circular flow pattern to occur and the lubricant travels down into the die cavity 14 and deposits a uniform coating on the walls of the cavity. In addition, the knock out pin 28 (FIG. 6) which, for example may be spring loaded to be depressed downwardly to the bottom of the cavity 14 when the metal slug is inserted into the machine for the forming operation, is also coated with the lubricant mixture in a uniform manner. The forming tool 30 shown in FIG. 6 is the tool which is used to punch down into the cavity at a high operating speed for the purpose of forming the metal part which is inserted into the cavity for the forming operation.

Machines of the type shown in FIG. 6 typically operate at very high speeds, for example, with approximately one part per second being formed in the machine. It is extremely important in the operation of such machines that the cavity be properly coated with lubricant mixture such that the parts being formed at the high operating speeds do not have distortions, bends, disconfigurations and the like, in the part being formed, as a result of the cavity 14 being improperly or nonuniformly coated with lubricant.

In accordance with the preferred aspects of the invention, it is usually desired that three or more of the special nozzle means designated 24 should be used, however, it is apparent that in some installations only two such nozzle openings may be required, whereas in other installations a plurality considerably higher than three of such nozzle openings may be desired.

The spray ring assembly designated 10 has been used under actual operating conditions in the forming of parts, such as the forming of valves for automobile internal combustion engines. The usage of the spray ring 10 in accordance with the invention under such actual operating conditions has been highly successful in preventing distortions, disconfigurations, scorching and the like in the formation of such metal parts.

Other aspects of the spray ring 10 are constituted by the countersunk holes designated 40 which may be used to fasten the spray ring in position on the forming machine 12. Other means of fastening or holding the spray ring may, of course, also be used. In addition, it is to be understood that the spray ring 10 as shown in operating position on the machine 12 in FIG. 6 may also be suitably mounted such that the spray ring 10 can be pivoted or lifted in and out of position adjacent the top of the cavity 14 at desired intervals of operation of the machine. This may be accomplished, for example, by using a pivoting mechanism and flexible conduit for attachment to the tube 20 as will be understood by those skilled in the art. In addition, if desired, the circular edge opening at the top of the cavity 14 may be chamfered or beveled slightly to assist in the desired tangential flow pattern for the lubricant.

In some applications, it may also be desirable to apply a similar uniform coating of the lubricant mixture to an overlying male portion of the forming apparatus or other associated portion thereof such as for example forming tool 30. The present invention may also be easily modified to accommodate simultaneous application of a lubricant mixture coating to the surfaces of such associated forming apparatus.

Figure 7:
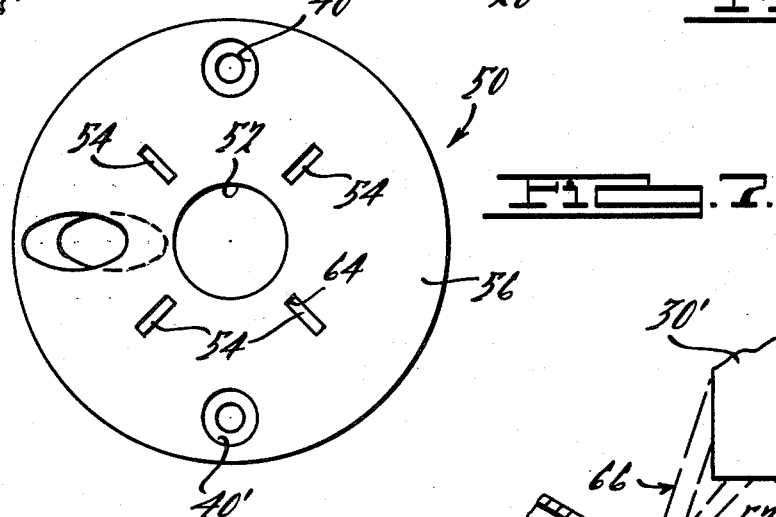
FIG. 7 is a plan view of another embodiment of the spray ring apparatus in accordance with the present invention.

Referring now to FIG. 7, another embodiment of the present invention is shown being indicated generally by reference number 50. Spray ring assembly 50 is quite similar to spray ring assembly 10 described above and accordingly like portions thereof as well as of the associated forming tooling have been indicated by the same reference numbers primed.

In addition to the tangential nozzle openings 24' provided around the periphery of central opening 52 of spray ring 50 similar to that described above with reference to spray ring 10, there are also provided a plurality of generally equally spaced radially extending slots 54 extending axially outwardly from the top surface 23' of annular manifold 22' and opening outwardly through outer surface 56 thereof. Preferably slots 54 will be substantially equally circumferentially spaced and of sufficient number to provide the desired coating of forming tool 30'. As shown, each of the plurality of slots 54 are substantially identical being defined by generally parallel radially extending sidewalls 58 and 60 and an upwardly radially inwardly beveled radially outer wall 62. The radially inner wall 64 may be generally axially extending or also be radially inwardly inclined if desired however to a lesser extent than outer wall 62. The specific angulation of the radially inner and outer sidewalls as well as the number of slots will be selected in conjunction with the distance or height of forming tool 30' above upper surface 56 of spray ring 50 as well as the size thereof so as to assure full coating thereof. As best seen with reference to FIGS. 8 and 9, the radially extending slots 54 will operate to provide a generally radially inwardly and axially outwardly directed fan spray pattern 66 which will provide a generally uniform and complete coating of the working surfaces of forming tool 30.

Figure 8:
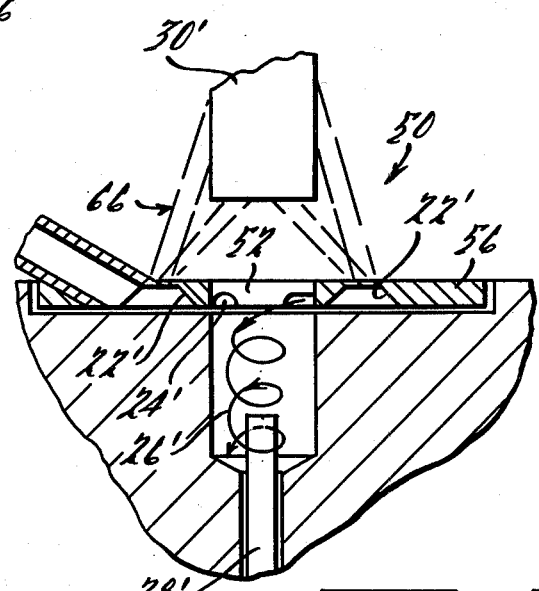
FIG. 8 is a fragmentary section view of a portion of the spray ring apparatus shown in FIG. 7 illustrating the application of a coating to a male portion of the forming apparatus.
Figure 9:
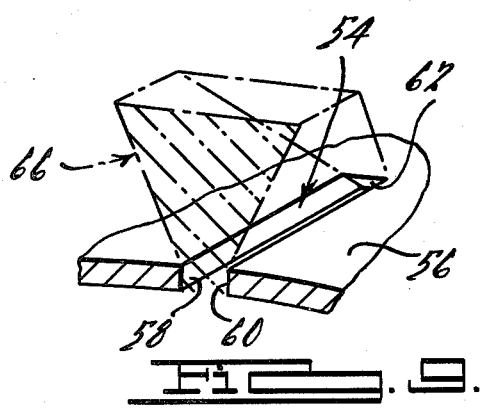
FIG. 9 is a fragmentary perspective view of an outwardly facing nozzle showing the spray pattern emanating therefrom.

As used hereinafter to describe the position of the slot 54, or "second nozzle", "outwardly" means toward shaping member 30 positioned outside the mold cavity as shown in FIG. 8.

Figure 10:
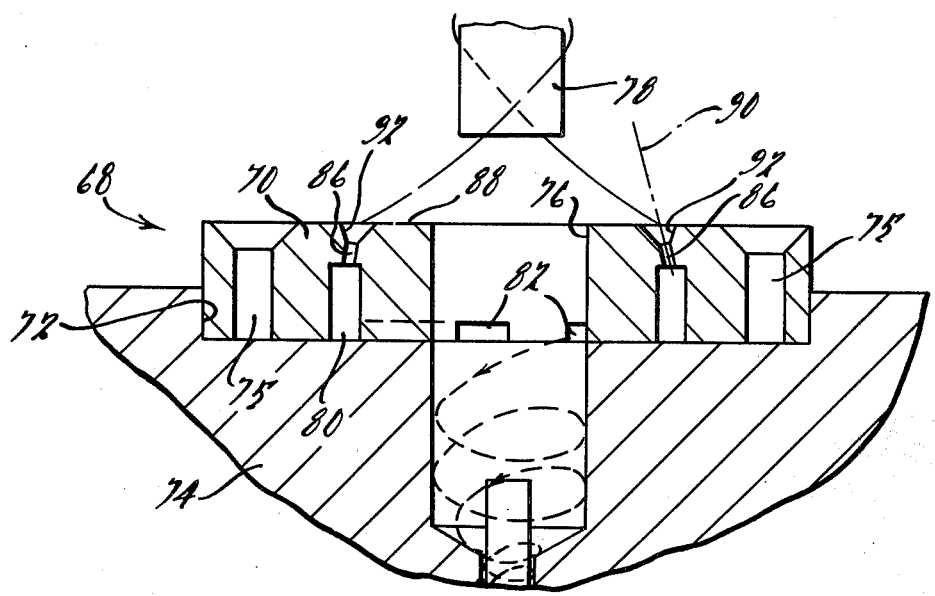
FIG. 10 is a view similar to FIG. 6 but showing another embodiment of the present invention.
Figure 11:
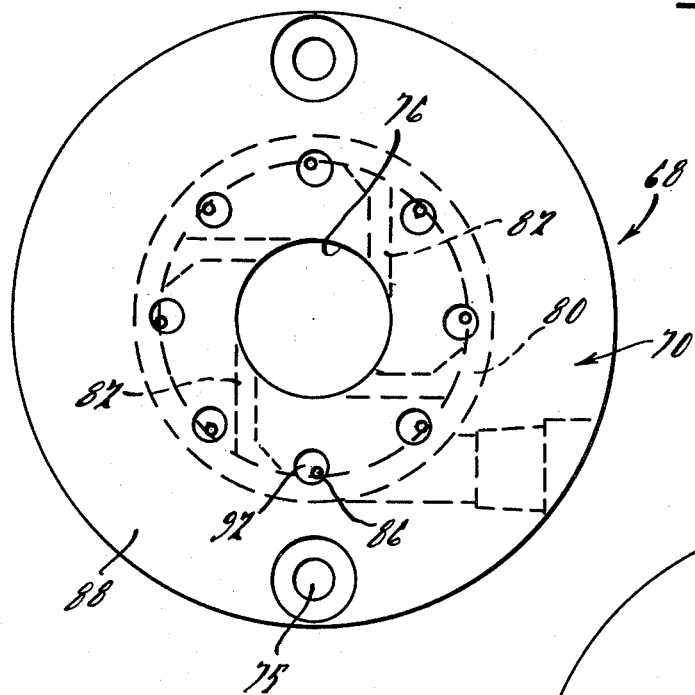
FIG. 11 is a plan view of the embodiment shown in FIG. 10.
Figure 12:
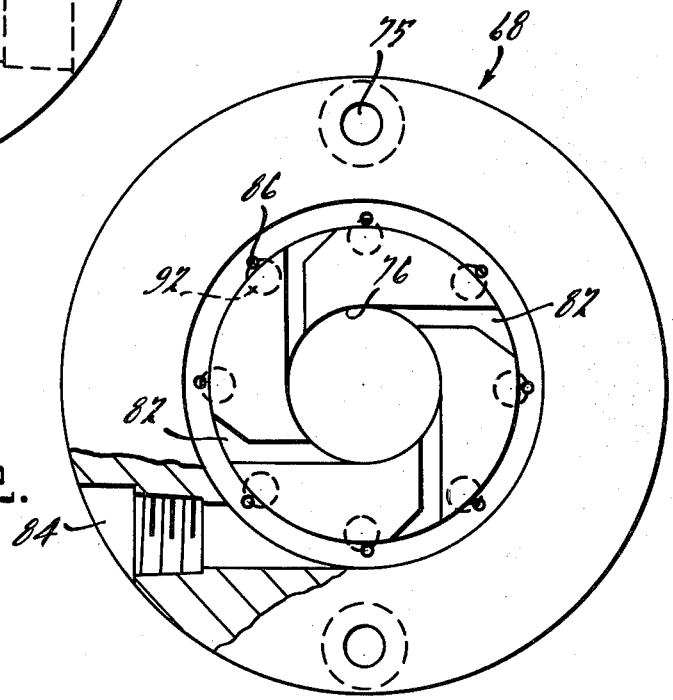
FIG. 12 is a bottom view of the embodiment shown in FIGS. 10 and 11 with a portion thereof broken away.

Another embodiment 68 of the present invention is illustrated in FIGS. 10 and 11. Spray ring 68 is also similar to spray ring 10 comprising a generally cylindrically shaped housing 70 adapted to be press fitted, slip fitted or otherwise secured within a recess 72 provided in a die 74. Alternatively, counterbored bores 75 may be provided in housing 70 whereby spray ring 68 may be secured to die 74 by threaded fasteners or the like. A central opening 76 is provided through which a suitable forming tool 78 may be moved and an annular manifold groove 80 is also provided spaced radially outwardly from opening 76. A plurality of tangential nozzle openings 82 are also provided extending from manifold groove 80 generally inwardly and opening tangentially into central opening 76 in substantially the same manner as described above with respect to spray assembly 10 so as to provide a generally helical tangential spray pattern within the die cavity. It should also be noted that in order to enhance the generally helical flowpath followed by the spray pattern, spray assembly 68 is provided with an inlet passage 84 to which a supply line may be connected to provide a supply of lubricant which, as best seen with reference to FIG. 12, opens into manifold groove 80 in a generally tangential relationship thereto so as to impart a circular flow to the lubricant as it enters manifold grooves 80.

In order to coat an overlying portion 78 of the forming apparatus, housing 70 has a plurality of relatively small diameter bores 86 extending from outwardly facing surface 88 of housing 70 into the manifold passage 80, the bores being substantially equally circumferentially spaced. As best seen with reference to FIG. 10, the axis 90 of the bores 86 will be inclined radially inwardly slightly and also in a generally tangential direction. The effect of this compound angling of the bores 86 will be to impart a spiralling helical flowpath of decreasing radius which will operate to insure a uniform complete coating of the overlying forming apparatus 78. In order to facilitate flaring or spreading of the spray pattern as it exits from bores, the outer portion of each of the bores is provided with a conical counter bore portion 92. The actual angle of inclination in both the radial and tangential directions will be selected for the particular application based upon the distance to the overlying forming apparatus 78 from the outer surface 88 of the spray ring 68 whereby the apex of the resulting generally conically spaced flowpath will be suitably positioned an appropriate distance outwardly from and generally coaxially with center opening 76. Additionally, the size of bores 86 and tangential nozzle openings 82 will be selected so as to provide a total cross sectional area equal to approximately 95 to 97% of the cross sectional area of the inlet 84 to manifold 80 so as to create a slight back pressure therein which will insure all passages and bores will operate to effect the desired uniform spray coating of the surfaces.

While the above described spray rings provide excellent uniform coating for a wide variety of male and female die portions, it may be desirable to modify the spray ring for certain applications such as for coating of die cavities 94 of the type shown in FIG. 13 which include a first or outer portion 96 of relatively large cross sectional area and a second or inner portion 98 of significantly smaller cross sectional area and having a relatively long axial dimension. The die cavity 94 shown in FIG. 13 may be described as being generally tulip-shaped and is designed for forming of intake and exhaust valves. The convex radiused transition area 100 between the inner and outer portions 98 and 96 has been an extremely difficult area to properly coat and yet represents an area of maximum wear.

In order to overcome the problems associated with providing complete lubricant coating to such die cavities 94, another embodiment of the spray ring of the present invention is shown being secured within a recess 102 in the outer surface 104 of die 106 being generally designated by reference number 108.

Spray ring 108 comprises a generally cylindrically shaped housing 110 having a central opening 112 extending therethrough. An annular manifolding passage 114 is also provided into which a generally tangential inlet passage 116 opens to provide a supply of lubricant mixture thereto. A plurality of substantially identical relatively small nozzle passages 118 are provided extending generally radially inwardly from manifold passage 114 and open into central opening 112 in generally tangential relationship thereto. The radially inner end portion 120 of each of these passages 118 is inclined axially inwardly so as to direct the spray pattern emanating therefrom in a generally axially inward direction into the die cavity 94. In order to facilitate dispersion or spreading of the spray pattern, an enlarged diameter counterbore 122 is provided in the sidewall of central opening 112 being positioned substantially coaxial with the inclined portion 120 of nozzle passage 118.

The resulting spray pattern emanating from these tangential axially inwardly inclined nozzle passages 118 will have a generally helical flow (as generally shown by dotted line 124) with a central axis angled so as to be generally directed to impinge on or near the high wear convex radiused transition portion 100 of the die cavity 94 so as to insure maximum effective coating thereof. Additionally, the spreading effect as well as the helical flow pattern will operate to provide a uniform coating on the surfaces of the larger outer portion 96 of the die cavity 94 and will also travel down the substantially smaller inner stem forming portion 98 of the die cavity 94 thereby assuring full coating of the entire die cavity within a minimal amount of spray time. It should also be noted that spray ring 108 may also have a plurality of spray nozzles 126 opening outwardly from the upper or outer surface 128 thereof which will be operative to apply a desired coating to the overlying male forming tool 130. Nozzles 126 are substantially identical to nozzles 86 described above and hence further description thereof is unnecessary. It should also be noted that the total cross sectional area of the nozzle passages 126 and spray nozzles 118 will be equal to approximately 95–97% of the cross sectional area of the inlet 116 so as to assure a slight back pressure. Alternatively, slots of the type described with reference to FIGS. 7-9 may be provided in lieu of nozzles 126.

Thus, as is now apparent, the spray ring of the present invention is well suited for rapidly and efficiently applying a complete and relatively uniform coating to both the cavity and overlying forming tool simultaneously. The various embodiments disclosed herein render the present invention well suited for use with substantially any and all forms of die cavities with the helical flowpath generated thereby being effective to provide the desired coating over even the most difficult to coat surfaces. Preferably, the spray ring of the present invention will be provided with a supply of atomized lubricant mixture from remotely located valve/nozzle means such as of the type disclosed in assignee's copending application Ser. No. 161,060 filed June 19, 1980.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A lubricant spraying apparatus for metal forming and glassware forming machines of the type having a forming cavity into which the material to be formed is placed, and nozzle means arranged to discharge fluid lubricant into the cavity prior to each forming operation such that the walls of the cavity and parts associated therewith in the forming operation are properly coated with the lubricant, said apparatus comprising:

spray ring means adapted to be positioned generally around the opening of the cavity, said nozzle means being positioned on the spray ring and directed toward said cavity so as to be operative to discharge fluid lubricant into the cavity in a helical tangential flow pattern, conduit means for connecting the nozzle means and spray ring means to a source of fluid lubricant whereby a predetermined amount of lubricant can be supplied to the cavity at desired intervals of operation.

2. A spraying apparatus as set forth in claim 1 wherein said nozzle means comprise a plurality of nozzles.

3. A spraying apparatus as set forth in claim 1 wherein said spray ring includes an inlet and an annular manifold passage, said inlet opening tangentially into said annular manifold passage so as to impart a circular circulation of said lubricant within said spray ring.

4. A spraying apparatus as set forth in claim 3 wherein said spray ring includes a central opening coaxially positioned with respect to said cavity and said nozzle means open radially inwardly into said central opening.

5. A spraying apparatus as set forth in claim 1 wherein said forming machine includes a forming tool overlying said cavity and said spray ring includes second nozzle means directed toward said forming tool so as to be operative to discharge fluid lubricant onto said forming tool.

6. A spraying apparatus as set forth in claim 5 wherein said second nozzle means comprise a plurality of generally radially extending slots provided on an outwardly facing surface of said spray ring.

7. A spraying apparatus as set forth in claim 6 wherein said slots are operative to provide a generally outwardly and radially inwardly directed spray pattern so as to substantially completely coat the working surfaces of said forming tool.

8. A spraying apparatus as set forth in claim 5 wherein the total cross sectional area of said nozzle means and said second nozzle means is less than the cross sectional area of said conduit means.

9. A spraying apparatus as set forth in claim 5 wherein said second nozzle means comprise a plurality of bores opening outwardly from the outer surface of said spray ring.

10. A spraying apparatus as set forth in claim 9 wherein said bores have an axis inclined radially inwardly and tangentially so as to impart a helical flow-path to said lubricant.

* * * * *

UNITED STATES PATENT AND TRADEMARK OFFICE
CERTIFICATE OF CORRECTION

PATENT NO. : 4,452,578

DATED : June 5, 1984

INVENTOR(S) : Walter E. Levine

It is certified that error appears in the above-identified patent and that said Letters Patent is hereby corrected as shown below:

ON SHEET 4 of 4 OF THE DRAWINGS, delete Figures 15 through 17.

ON THE TITLE PAGE, UNDER THE HEADING "INVENTORS",
delete "Allan B. Heath" and "Richard C. Gossman".

Column 8, line 28, (Claim 11), insert the following:

"11. A lubricant spraying apparatus for material forming machines used to form metal, glassware, or plastic and being of the type having a forming cavity into which the material to be formed is placed, said spraying apparatus including nozzle means arranged to discharge fluid lubricant into the cavity prior to each forming operation such that the walls of the cavity and parts associated therewith in the forming operation are properly coated with the lubricant, said apparatus being comprised of spray means positioned generally around the opening of the cavity, said spray means including first nozzle means operative such that said first nozzle means discharges fluid lubricant into the cavity in a helical tangential flow pattern, second nozzle means operative to discharge fluid lubricant in a direction outwardly from said cavity so as to apply said lubricant to a forming tool overlying said cavity; and

UNITED STATES PATENT AND TRADEMARK OFFICE
CERTIFICATE OF CORRECTION

PATENT NO. : 4,452,578

DATED : June 5, 1984

INVENTOR(S) : Walter E. Levine

It is certified that error appears in the above-identified patent and that said Letters Patent is hereby corrected as shown below:

conduit means for connecting the nozzle means to a source of fluid lubricant whereby a predetermined amount of lubricant can be supplied to the cavity and overlying forming tool at desired intervals of operation.

On the title page "10 Claims, 17 Drawing Figures" should read --11 Claims, 14 Drawing Figures--.

Signed and Sealed this

*Thirtieth* Day of *October 1984*

[SEAL]

*Attest:*

*Attesting Officer*

GERALD J. MOSSINGHOFF

*Commissioner of Patents and Trademarks*